Sept. 22, 1959   W. E. SARGEANT   2,905,832
POWER SUPPLY MEANS
Filed June 24, 1957
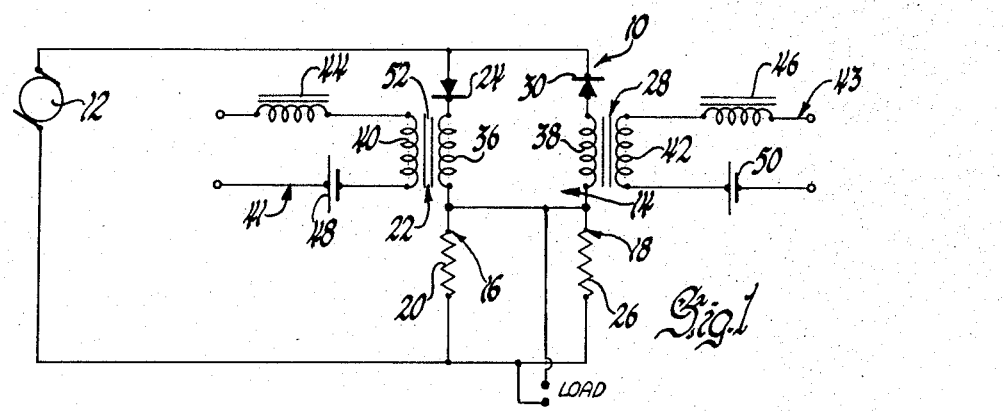
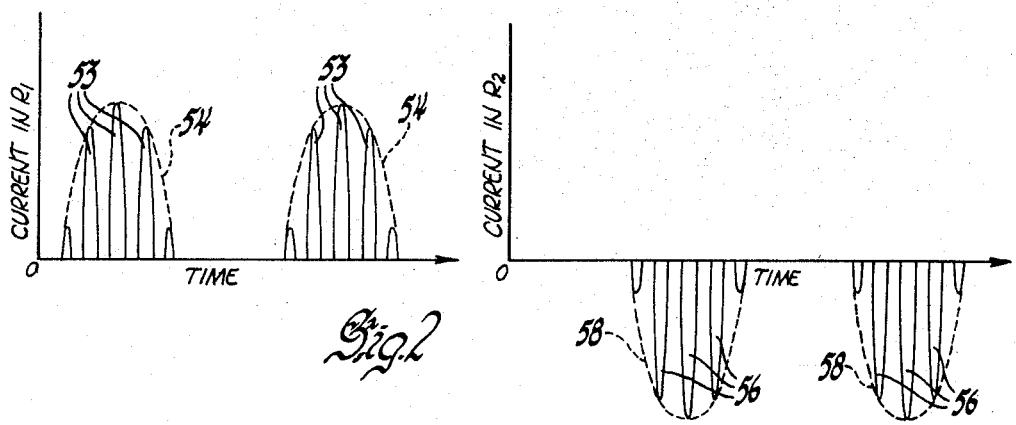
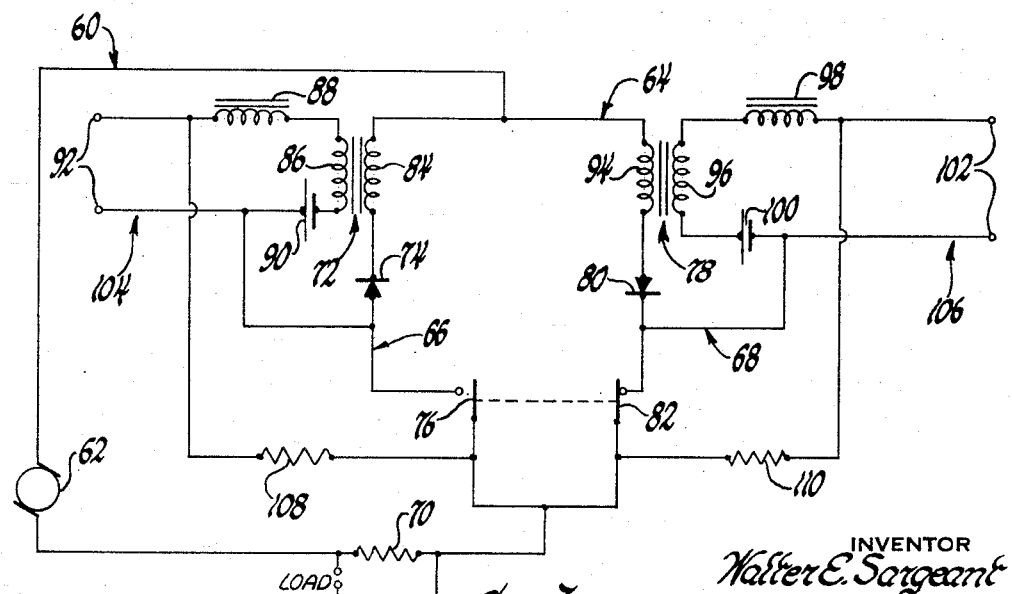
INVENTOR
Walter E. Sargeant
BY
L. D. Burch
ATTORNEY

United States Patent Office 2,905,832
Patented Sept. 22, 1959

2,905,832
POWER SUPPLY MEANS

Walter E. Sargeant, Huntington Woods, Mich., assignor to General Motors Corporation, Detroit, Mich., a corporation of Delaware Application June 24, 1957, Serial No. 667,561

7 Claims. (Cl. 307—72)

The present invention relates to means for generating alternating electrical power and, more particularly, to power supply means for generating such power with a constant frequency.

In an electrical power distribution system of the alternating current type, it is desirable for the frequency of the system to remain substantially constant at all times. Normally, the frequency of such a system is controlled by regulating the speed of the generator. However, in certain instances, for example, in aircraft and other vehicles, the power for the electrical system is supplied by a generator driven by a power take-off on an engine, the primary purpose of which is to drive the vehicle. Since the speed of such an engine varies over a wide range, it is extremely difficult, if not impossible, to maintain the frequency of the electrical system substantially constant. This problem is particularly acute where there are a plurality of generators feeding into a common distribution system with each generator being driven by a separate variable speed prime mover. In an effort to solve this problem, variable speed drives and other elaborate control systems have been devised.

It is now proposed to provide a simple and reliable power supply system for maintaining the frequency in an electrical distribution system substantially constant. More particularly, this is to be accomplished by providing a generator having a minimum frequency in excess of the frequency of the distribution system. The generator is then interconnected with the distribution system by a frequency conversion circuit that decreases the variable high frequency to a constant lower frequency. This frequency conversion circuit may include a pair of branches in series with a load. Each of the branches includes a rectifier element and a switch. The rectifier element is adapted to permit current to only flow through the branch in a direction opposite to the current flow in the other branch. The switches are synchronously actuated at a frequency corresponding to the fixed frequency. Thus for one-half cycle of the fixed frequency, the pulses of higher frequency current of one polarity will flow through one branch and the load. During the other half cycle pulses of reversed polarity will flow in the other branch and through the load in the opposite direction. As a result an alternating current of a fixed frequency as determined by the operation of the switch means will appear in the load.

In the one sheet of drawings:

Figure 1 is a wiring diagram of a power supply system embodying the present invention.

Figure 2 is a view of wave forms in various portions of the system of Figure 1.

Figure 3 is a wiring diagram of a modification of the present invention.

Referring to the drawing in more detail, the present invention may be embodied in a power supply system 10 which includes a generator 12 and a frequency conversion circuit 14 that interconnects the generator 12 with the distribution system or load. The generator 12 is adapted to be driven by any suitable means and to have a frequency higher than the frequency which it is desired to maintain in the distribution system. It should be noted that the speed of the generator 12 and, accordingly, the frequency of the power therefrom, can vary over a considerable range.

The frequency conversion circuit 14 includes a first branch 16 and a second branch 18 which are disposed in parallel with each other. The first branch 16 includes a loading resistor 20, a variable reactor 22 and a rectifier element 24 arranged to let the current flow in a downwardly direction only. The second branch 18 is similar to the first branch 16. It includes a loading resistor 26, a variable reactor 28 and a rectifier element 30. This element 30 has the polarity thereof reversed to that of the first element 24. The current in the two branches 16, 18 can therefore only flow in opposite directions.

Each of the variable reactors 22, 28 comprises a transformer having power windings 36, 38 in the associated branch 16, 18, respectively, and the control windings 40, 42 energized by circuits 41, 43 having reactances or chokes 44, 46 and biasing batteries 48, 50. The input to the circuits 41, 43 are interconnected with a synchronizing signal having a frequency corresponding to that of the distribution system. The biasing batteries 48, 50 and the chokes 44, 46 will prevent A.C. supply currents from flowing in the control circuit.

During one-half cycle of the synchronizing signal, the polarity of the signal and the battery 48 will be the same and a maximum current will flow in the primary winding 40. This current will saturate the core 52 of the reactance 22. The reactance of the winding 36 will then be a minimum and the current may flow freely only in a downwardly direction through the branch 16. During this half cycle the synchronizing signal in the other branch 18 will oppose the battery 50 and the current flow will be a minimum. Thus the reactance of the winding 38 will be a minimum and the current will be prevented from flowing in this branch. During the other half cycle this condition will be reversed. The polarity of the battery 48 and synchronizing signal will be opposed and the current in the primary 40 will be substantially eliminated. As a result the current in the branch 16 will be eliminated. However, at the same time battery 50 and the synchronizing signal will be additive and the current in the winding 42 a maximum. Thus the current will flow upwardly in branch 18. It can be seen that by phasing the synchronizing signals for the reactors by 180°, they will alternately block the flow of current in the two branches. Accordingly, if the load or distribution system is disposed in parallel to the load resistors 20, 26 for one-half cycle of the load frequency, the current in the second branch 18 will be blocked and the current in the first branch 16 will flow in a downwardly direction only. This will produce a series of unidirectional pulses 53 in the load that have a frequency corresponding to that of the generator and an envelope 54 as shown in Figure 2. During the other half cycle the conditions will reverse. The current in the first branch 16 will be blocked and the rectifier 30 in the second branch will permit the current in the other branch 18 to only flow in the opposite direction. As a result the load will then have another series of unidirectional pulses 56 with a frequency of the generated voltage and an envelope 58 that will supplement the first envelope to form a sine wave having a frequency identical to that of the synchronizing signal. Thus the load frequency will be entirely independent of the generated frequency.

It should be noted that a plurality of variable speed generators may be employed for supplying power to a common distribution system without synchronizing the generators. Under such circumstances it is merely necessary to employ a common synchronizing signal in all of the control circuits. It should be noted that by employing a multiple supply source, particularly of a polyphase variety, the gaps in the wave shapes will be filled in more easily.

As a modification, the power supply 60 of Figure 3 may be provided. This power supply 60 includes a generator 62 and a frequency conversion circuit 64. The generator 62 may be driven by any suitable prime mover. The conversion circuit 64 includes a pair of branches 66, 68 in parallel to each other and in series with a load 70 or distribution system. The first branch 66 includes a variable reactor 72, a rectifier 74 and a switch 76. The rectifier 74 is arranged to permit current to flow in an upward direction only. The second branch 68 is similar to the first branch 66. It includes a variable reactor 78, a rectifier 80 and a switch 82. However, the rectifier 80 in the second branch 68 is reversed from the rectifier in the first branch 66 and is arranged to allow current to flow downwardly only or in the opposite direction from that in the first branch 66.

The secondary 84 of the reactor 72 is in the first branch 66 while the primary 86 is energized by a primary circuit which includes a choke 88, a battery 90 and an inlet 92. The secondary 94 of the other reactor 78 is in the second branch 68 while the primary 96 is energized by a circuit which includes a choke 98 and a battery 100. The inlets 92, 102 to the primary circuits are adapted to be interconnected with a synchronizing signal having a frequency equal to the frequency of the distribution system. The switches 76, 82 may be of the mechanical type and driven in synchronism with the synchronizing signal. By opening the switch in the non-conducting branch, the voltage produced by the current flowing through the conducting branch to the load will not disturb proper functioning of the blocking branch. In order to prevent arcing at the switch points and insure the elimination of any leakage current, a blocking voltage may be provided across the switches 76, 82. This voltage is obtained from the synchronizing signal by branch circuits 104, 106. Short circuiting in the branches 104, 106 during a closed switch is prevented by the blocking resistors 108, 110.

During operation of the modification the blocking current in the transformer 72 will reduce the current in the first branch 66 to substantially zero. At that time the switch 76 will open and prevent the flow of current through that branch 66 simultaneously therewith. The blocking voltage will also tend to reduce the current flow and prevent arcing at the switch 76. The switch 82 in the other branch 68 will be closed and the high frequency pulses of current will flow therethrough. This condition will be maintained for one-half cycle of the fixed frequency in the distribution system. Then the synchronizing signal will reverse and the switches 76, 82 will reverse their positions. This will then permit the high frequency pulses of current to flow through the other branch 68 in the opposite direction and not in the first branch 66. Accordingly, the load will receive substantially constant frequency power. In the event a plurality of generators are employed, a corresponding number of conversion circuits are provided that are driven from a common synchronizing source.

Various changes and modifications of the embodiments of the invention described herein may be made by those skilled in the art without departing from the spirit and principles of the invention.

I claim:

1. An apparatus for generating a constant frequency voltage, said apparatus comprising a high frequency power source, a circuit connected across the output of said power source, said circuit including a load in series with a pair of parallel branches, rectifying means in each of said branches, each of said rectifiers being adapted to permit the current in its respective branch to only flow in a direction opposite to that in the other branch, switching means in each of said branches for alternately permitting the current to flow through one or the other of said branches and into said load for periods corresponding to half of the cycle of said fixed frequency.

2. An apparatus for generating a constant frequency voltage, said apparatus comprising a high frequency power source, a circuit connected across the output of said power source, said circuit including a load in series with a pair of parallel branches, rectifying means in each of said branches, said rectifiers being adapted to permit the current in its respective branch to only flow in a direction opposite to that in the other branch, means in each branch for applying a blocking voltage to alternately permit and prevent the flow of current through that branch for periods corresponding to half cycles of said fixed frequency.

3. An apparatus for converting an electrical voltage of variable frequency into an electrical voltage having a constant frequency, said apparatus comprising a high frequency power source, a circuit connected across the output of said power source, said circuit including a load in series with a pair of parallel branches, each of said branches including rectifying means therein for allowing the current in each branch to only flow in one direction, said rectifiers being arranged so that said unidirectional currents in each branch will be opposite to that in the other branch, switching means in each of said branches for alternately permitting the current to flow through said branches and into said load for periods corresponding to half of the cycle of said fixed frequency and means for actuating said switching means at the said constant frequency.

4. An apparatus for converting an electrical voltage of variable frequency into an electrical voltage having a constant frequency, said apparatus comprising a high frequency power source, a circuit connected across the output of said power source, said circuit including a load in series with a pair of parallel branches, each of said branches including rectifying means therein for allowing the current in each branch to only flow in one direction, said rectifiers being arranged so that said unidirectional currents in each branch will be opposite to that in the other branch, means in each of said branches for applying a blocking voltage to the branch to alternately permit and prevent the flow of current through that branch for periods corresponding to half cycles of said fixed frequency, means for alternately applying said blocking voltages at said constant frequency.

5. An apparatus for generating a constant frequency voltage, said apparatus comprising a high frequency power source, a circuit connected across the output of said power source, said circuit including a load in series with a pair of parallel branches, rectifying means in each of said branches, said rectifiers being adapted to permit the current in its respective branch to only flow in a direction opposite to that in the other branch, switching means in each of said branches for alternately permitting the current to flow through one or the other of said branches, and means for applying a blocking voltage of lower frequency to each branch to alternately prevent the flow of current through said branches.

6. An apparatus for generating a constant frequency voltage, said apparatus comprising a high frequency power source, a circuit connected across the output of said power source, said circuit including a load in series with a pair of parallel branches, rectifying means in each of said branches, said rectifiers being adapted to permit the current in its respective branch to only flow in a direction opposite to that in the other branch, switching means in each of said branches for alternately permitting the current to flow through one or the other of said branches, separate blocking voltage means in each of said branches energized in synchronism with said switch means for reducing the current in the branches to substantially zero before the associated switch opens.

7. An apparatus for generating a constant frequency voltage, said apparatus comprising a high frequency power source, a circuit connected across the output of said power source, said circuit including a load in series with a pair of parallel branches, rectifying means in each of said branches, said rectifiers being adapted to permit the current in its respective branch to only flow in a direction opposite to that in the other branch, separate switch means in each of said branches for alternately permitting the current to flow through one or the other of said branches, separate blocking voltage means in each of said branches for preventing the current flow in the branches, means for actuating said switching means and said blocking voltage means in synchronism with said constant voltage whereby said blocking voltage will reduce the current flow in a branch to substantially zero before the associated switch means in that branch opens.

References Cited in the file of this patent

UNITED STATES PATENTS

| | | |
|---|---|---|
| 2,265,296 | Lee | Dec. 9, 1941 |
| 2,776,379 | Sargeant | Jan. 1, 1957 |

FOREIGN PATENTS

| | | |
|---|---|---|
| 103,349 | Australia | Feb. 25, 1938 |